United States Patent
Applegarth et al.

(10) Patent No.: US 11,491,435 B2
(45) Date of Patent: Nov. 8, 2022

(54) METHODS AND SYSTEMS FOR REMOVING AMMONIA FROM A GAS MIXTURE

(71) Applicant: ENTEGRIS, INC., Billerica, MA (US)

(72) Inventors: Charles H. Applegarth, San Luis Obispo, CA (US); Rocky D. Gipson, San Marcos, CA (US); Sarah Vogt, Grover Beach, CA (US); Joshua T. Cook, San Diego, CA (US); Matthew Browning, San Luis Obispo, CA (US); Marco Holzner, San Luis Obispo, CA (US)

(73) Assignee: ENTEGRIS, INC., Billerica, MA (US)

( * ) Notice: Subject to any disclaimer, the term of this patent is extended or adjusted under 35 U.S.C. 154(b) by 125 days.

(21) Appl. No.: 16/879,444

(22) Filed: May 20, 2020

(65) Prior Publication Data
US 2020/0368668 A1 Nov. 26, 2020

Related U.S. Application Data

(60) Provisional application No. 62/852,478, filed on May 24, 2019.

(51) Int. Cl.
*B01D 53/04* (2006.01)
*C01C 1/02* (2006.01)
(Continued)

(52) U.S. Cl.
CPC ......... *B01D 53/0438* (2013.01); *B01D 45/12* (2013.01); *B01D 50/20* (2022.01);
(Continued)

(58) Field of Classification Search
CPC ............ B01D 53/0407; B01D 53/0438; B01D 53/0462; B01D 53/047; B01D 53/0473; B01D 53/0476; B01D 53/053; B01D 53/06; B01D 53/08; B01D 53/10; B01D 53/12; B01D 45/12; B01D 50/002; B01D 2253/102; B01D 2253/108; B01D 2256/10; B01D 2256/16; B01D 2257/406; B01D 2257/706; B01D 2258/0216; B01D 2259/40001; B01D 2259/40088; B01D 2259/401; B01D 2259/402; C01C 1/02; C01C 1/024; C01C 1/12
See application file for complete search history.

(56) References Cited

U.S. PATENT DOCUMENTS

| | | |
|---|---|---|
| 5,160,512 A | 11/1992 | Talu |
| 5,518,528 A | 5/1996 | Tom |

(Continued)

FOREIGN PATENT DOCUMENTS

| | | |
|---|---|---|
| CN | 202893187 U | 4/2013 |
| CN | 203693103 U | 7/2014 |

(Continued)

OTHER PUBLICATIONS

CN108744882A_ENG (Espacenet machine translation of Wang) (Year: 2018).*

*Primary Examiner* — Gabriel E Gitman

(57) ABSTRACT

Described are methods, devices, and systems useful for removing gaseous ammonia from a gas mixture at a pressure in an ambient pressure range by allowing the ammonia to adsorb onto a solid adsorbent, as well as related systems and methods.

15 Claims, 11 Drawing Sheets

(51) Int. Cl.
　　　*B01D 45/12* 　　　(2006.01)
　　　*B01D 50/20* 　　　(2022.01)
(52) U.S. Cl.
　　CPC ............ *C01C 1/02* (2013.01); *B01D 53/0462* (2013.01); *B01D 2253/102* (2013.01); *B01D 2256/10* (2013.01); *B01D 2256/16* (2013.01); *B01D 2257/406* (2013.01); *B01D 2257/706* (2013.01); *B01D 2258/0216* (2013.01); *B01D 2259/401* (2013.01); *B01D 2259/40001* (2013.01); *B01D 2259/402* (2013.01); *B01D 2259/40088* (2013.01)

(56) References Cited

U.S. PATENT DOCUMENTS

| | | | |
|---|---|---|---|
| 5,704,965 | A | 1/1998 | Tom |
| 6,132,492 | A | 10/2000 | Hultquist et al. |
| 6,261,345 | B1 * | 7/2001 | Miyano .............. B01D 53/0423 95/115 |
| 6,491,884 | B1 * | 12/2002 | Faller ................. B01D 53/02 96/108 |
| 6,500,487 | B1 * | 12/2002 | Holst ................. C23C 16/4412 427/248.1 |
| 6,749,671 | B2 | 6/2004 | Holst |
| 6,749,819 | B2 | 6/2004 | Otsuka |
| 8,409,895 | B2 | 4/2013 | Zhu |
| 8,889,090 | B2 | 11/2014 | Izaki et al. |
| 9,211,493 | B2 | 12/2015 | Applegarth et al. |
| 2008/0237131 | A1 | 10/2008 | Brown |
| 2014/0013942 | A1 | 1/2014 | Wójtowicz |
| 2014/0161699 | A1 * | 6/2014 | Applegarth ........ B01D 53/0476 95/95 |
| 2015/0322566 | A1 * | 11/2015 | Goeres ................ C23C 16/4412 427/255.28 |
| 2019/0083919 | A1 | 3/2019 | Gazzani |

FOREIGN PATENT DOCUMENTS

| | | | |
|---|---|---|---|
| CN | 108744882 A | * 11/2018 | ............ B01D 51/10 |
| CN | 108744882 A | 11/2018 | |
| CN | 108658042 B | 11/2019 | |
| KR | 101211625 B1 | 12/2012 | |
| WO | 00403241 W | 7/2000 | |

* cited by examiner

METHODS AND SYSTEMS FOR REMOVING AMMONIA FROM A GAS MIXTURE

CROSS-REFERENCE TO RELATED APPLICATIONS

This application claims the benefit under 35 USC 119 of U.S. Provisional Patent Application No. 62/852,478, filed May 24, 2019, the disclosure of which is hereby incorporated herein by reference in its entirety for all purposes.

FIELD OF THE INVENTION

The invention relates to methods, devices, and systems useful for removing gaseous ammonia from a gas mixture, at a pressure in an ambient pressure range, by allowing the ammonia to adsorb onto solid adsorbent.

BACKGROUND

In chemical processing industries, ammonia is useful as a raw material for various types of processing and manufacturing steps. It is produced as a by-product of various processes and can be included in an effluent or exhaust stream of a chemical process.

In semiconductor manufacturing, ammonia is a useful raw material or can be a processing by-product. In a particular example, ammonia is used along with organometallic compounds for preparing nitride materials (e.g., gallium nitride crystals) that function as light emitting devices (LEDs). An important and high-cost feature of the process is the growth of active semiconducting layers by epitaxial deposition, which is performed by metal-organic chemical vapor deposition (MOCVD). The step of MOCVD creates metal-nitride compounds such as indium gallium nitride (InGaN) from volatile metal-organic precursors such as trimethyl gallium, also in combination with a source of nitrogen such as ammonia. For this process, ammonia is required in a relatively high flow rate during the relatively slow nitride-crystal growth process. Even trace amounts of impurities in the ammonia gas can produce a significant amount of unwanted atoms being incorporated into a deposited crystal. To reduce impurities, state-of-the-art LEDs are made using ammonia that typically undergoes multiple stages of purification, for example to contain no more than 1 part-per-billion (ppb) of moisture or oxygen.

Unfortunately, ammonia is not used efficiently in MOCVD processes. The process requires a very large volume of high purity ammonia as a raw material, much of which passes through the processing step unreacted to become part of a process exhaust stream. That exhaust stream is a heated gas mixture that contains a substantial amount of ammonia, metal-containing precursors (organometallic vapor) such as trimethyl gallium precursors, non-organometallic vapors such as hydrogen ($H_2$) and nitrogen ($N_2$), and, possibly, particles such as organometallic particles. The exhaust gas mixture will flow from the MOCVD process at an elevated temperature, such as a temperature of 300, 400, or 500 degrees Celsius and at an ambient flow pressure.

Desirably, to reduce cost and waste, the ammonia contained in this type of heated exhaust gas mixture can be collected and re-used. However, first the ammonia must be separated from the gas mixture, which can also involve reducing the temperature of the exhaust gas and removing organometallic vapor and any particle debris from the gas mixture.

Chemical processing industries, including the semiconductor industry, are in constant search for new and improved methods for removing ammonia from a gas mixture. The gas mixture may be derived from any source, including but not limited to an exhaust of an LED manufacturing process.

With particular consideration to common LED manufacturing processes, which rely on the use of high volumes of ammonia (along with hydrogen and nitrogen), ammonia is a relatively expensive gas and has a relatively high disposal cost. Thus, the recycling of ammonia from exhaust of an LED reactor will have multiple benefits. The LED manufacturing process is inefficient with respect to using ammonia, and only uses a small portion of the ammonia added to a process. A large portion of the ammonia put into the process flows through to the exhaust stream. Currently, the disposal of ammonia is performed by either dissolving ammonia of an exhaust stream into water to form ammonium hydroxide or performing elementary neutralization of the ammonia using dilute aqueous acid. The resulting solution of either method is then flushed into a sewer system. Customers are typically charged by the gallon for disposal costs. LED illumination is considered a green technology. For these general and specific reasons, a better process for handling ammonia in a waste stream of LED manufacturing would be a desired improvement compared to currently-practiced methods of ammonia disposal.

SUMMARY

The invention relates to methods, devices, and systems useful for removing gaseous ammonia from a gas mixture at a pressure in an ambient pressure range, by allowing the ammonia to adsorb onto solid adsorbent.

The gas mixture can be any gas mixture used in a commercial process and can include ammonia in combination with non-ammonia vapors, particle debris (materials such as suspended micro-particles including micro-particles, sub-micron particles, nanoparticles, etc.), or both. The gas mixture may be derived from or designed for use with a commercial chemical process.

As one example, certain gas mixtures that can be processed by methods of the present description are in the form of heated exhaust streams produced by industrial processes of depositing a nitride onto a semiconductor or microelectronic substrate, such as by chemical deposition of gallium nitride (GaN) for preparing LEDs. However, while the following description highlights this particular exemplary use of the inventive methods, devices, and systems, the inventive methods, devices, and systems will be effective to remove ammonia from various other types of gas mixtures used in or derived from other commercial processes.

In one aspect, disclosed is a method of removing ammonia from a gas mixture that contains gaseous ammonia. The method includes delivering the gas mixture at ambient flow pressure to a vessel that contains solid adsorbent and contacting the gas mixture at ambient flow pressure with the solid adsorbent to cause the ammonia to adsorb onto the solid adsorbent.

In another aspect, disclosed is a method of treating a gas mixture that contains ammonia, non-ammonia vapor, organometallic vapor, and solid particles. The method includes cooling the gas mixture by passing the gas mixture through a heat exchanger to produce a cooled gas mixture; passing the cooled gas mixture through a particle filter to remove solid particles; passing the cooled gas mixture through a first solid adsorbent to adsorb organometallic vapor onto the solid adsorbent; and contacting the cooled gas mixture with a second solid adsorbent to cause ammonia to adsorb onto the solid adsorbent.

In yet another aspect, disclosed is a system for processing a gas mixture that contains organometallic vapor, particles, and non-organometallic vapor. The system includes a heat exchanger adapted to reduce a temperature of the gas mixture; a particle filter capable of removing solid particles from the gas mixture; an organometallic vapor removal filter capable of removing organometallic vapor from the gas mixture; and a vessel that contains solid adsorbent capable of removing ammonia vapor from the gas mixture by adsorbing the ammonia vapor onto the solid adsorbent at conditions that include an ambient flow pressure and an ammonia adsorption temperature, wherein the heat exchanger, the particle filter, the organometallic vapor removal filter and the vessel are in fluid communication with each other.

BRIEF DESCRIPTION OF THE FIGURES

The disclosure may be more completely understood in consideration of the following description of various illustrative embodiments in connection with the accompanying figures.

Figure 1A:
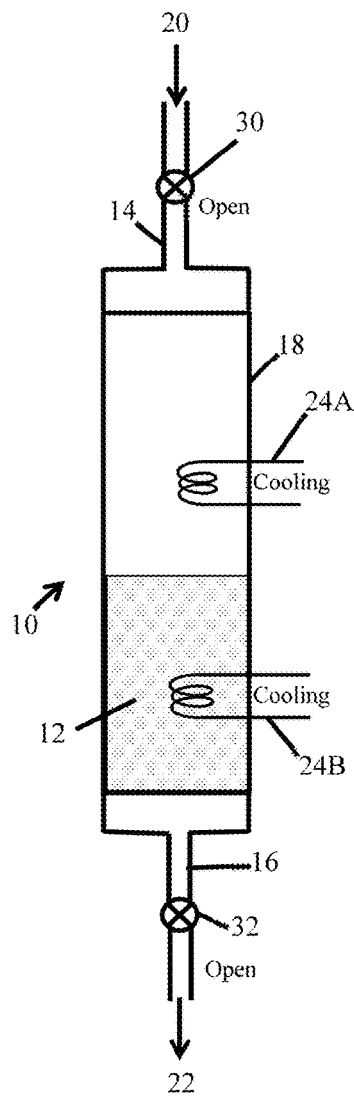
FIGS. 1A, 1B, and 1C show an example of a device and related method steps as described, that use solid adsorbent to remove ammonia vapor from a gas mixture.

All figures are exemplary, schematic, and not necessarily to scale.

DETAILED DESCRIPTION

The following is a description of methods, systems, devices, and combinations of devices that are useful for removing ammonia from a gas mixture by adsorbing the gaseous ammonia in the gas mixture, at a pressure in an ambient pressure range, onto solid adsorbent. The methods, systems, and devices are useful for removing ammonia from the gas mixture, for instance to allow the ammonia to be collected, purified, and re-used. Example methods of removing ammonia from a gas mixture can be performed in combination with other steps of a series of steps used to process the gas mixture. Other steps may include one or more of a cooling step, a step of removing particles (e.g., micro-particles) from the gas mixture, and a step of removing one or more other types of vapor from the gas mixture such as organometallic vapor.

The gas mixture can be one that is useful in or is derived from any chemical process that involves ammonia vapor as part of a gas mixture, e.g., as a raw material or as an effluent. The gas mixture may contain a more than insubstantial amount of ammonia in gaseous (vapor) form, such as at least 15, 20, 30, or 40 percent (volume) ammonia. The gas mixture also contains non-ammonia vapors, solid particles (e.g., micro-particles, sub-micron-sized particles, etc.), or both.

Non-ammonia vapor in a gas mixture may be any vapor that is contained in the gas mixture due to being present in an upstream or previous process step, for example as a reactant, a reaction product, processing aid, or to perform any other chemical or physical function. Examples of non-ammonia vapor can include common vapors present in industrial chemical processes such as nitrogen vapor ($N_2$), hydrogen vapor ($H_2$), water vapor ($H_2O$), oxygen ($O_2$), or carbon dioxide ($CO_2$).

In the present description, the terms "gaseous" and "vapor" are used in a manner that is consistent with the use of these terms in chemical processing technologies, and refer to a chemical material that exists in molecular form in the state of a gas (as opposed to a solid or a liquid), e.g., ammonia vapor is molecular ammonia present in the form of a gas, for example as a component of a gas mixture. An organometallic vapor is an organometallic compound that exists in a gas mixture in molecular form.

The gas mixture can also contain non-vapor materials such as suspended solid particles that are larger than molecules of a vapor. Example particles can be greater than 10 microns. Other particles can be solid particles referred to as "micro-particles" having a particle size below 10 microns, which also includes sub-micron-sized particles, e.g., particles having a size of below 1 micron including below 0.5 micron and down to about 0.1 micron. These types of particles may be derived from agglomeration of reactants or reaction products of a chemical process, from intrusion of moisture or oxygen, or from equipment or other solid materials involved in delivering or controlling a chemical process or chemical process environment. Examples of particles that may be contained in a gas mixture include organometallic micro-particles that are made of organometallic compounds as described herein with respect to the organometallic vapor, or metal-containing hydroxide or oxide by-products.

During adsorption of ammonia vapor onto the solid adsorbent, the gas mixture and solid adsorbent are each independently at a temperature that allows effective and efficient adsorption of the ammonia vapor onto the adsorbent. The gas mixture and solid adsorbent are each independently at an ammonia adsorption temperature, which is a temperature that, at the ambient flow pressure condition of the gas mixture when contacting the solid adsorbent, the ammonia adsorbs onto the solid adsorbent in an amount that allows for efficient and effective removal of the ammonia from the gas mixture. To cause temperatures of the gas mixture, the adsorbent, or both, to be sufficiently low to cause effective adsorption of ammonia on the gas mixture to adsorb onto the solid adsorbent at an ambient flow pressure, the gas mixture, the solid adsorbent, or both, may be cooled, e.g., by refrigeration and a cooling element that contacts the solid adsorbent, the gas mixture, or both, or that contacts a container, vessel, or flow structure of the solid adsorbent or gas mixture to remove heat from the solid adsorbent or gas mixture. Preferably, the ammonia adsorption temperature is not a temperature that also allows for or causes adsorption of a non-ammonia vapor (e.g., hydrogen, oxygen, nitrogen, or the like) onto the solid adsorbent. A non-limiting example of a useful ammonia adsorption temperature can be below 0 degrees Celsius, e.g., from −40 to 0 degrees Celsius, e.g., from −30 to −25 degrees Celsius. Lower temperatures can also be useful.

Also during adsorption of ammonia vapor onto the solid adsorbent, the gas mixture is introduced to the solid adsorbent with the gas mixture being at an ambient flow pressure. The step of contacting the gas mixture with the solid adsorbent should occur in a manner to allow a high amount of adsorption of the ammonia vapor onto the solid adsorbent, i.e., efficient removal of much or most of the amount of ammonia vapor present in a gas stream. A useful pressure of the gas mixture can be one that is common or typical for efficiently moving a continuous flow of gaseous fluid through or from an industrial chemical process, e.g., as part of or derived from an exhaust stream, and that is considered to be non-pressurized, meaning at about ambient pressure conditions. The flow can be one that is considered a "forced" flow of gaseous fluid driven by a mechanical force, such as that produced by vacuum or an impeller (e.g., fan), but that is not driven by or subjected to a pressure produced by a compressor or reduced temperature. A pressure commonly used for such non-pressurized or "ambient"—pressure industrial gas flow processes can be below 2 atmospheres (gauge), e.g., below 1.5 or 1.3 atmosphere (gauge), and is referred to herein as an "ambient flow pressure."

The processing conditions for contacting the gas mixture with the solid adsorbent can be effective to efficiently remove a large amount of ammonia vapor from a gas stream. For example, an amount of ammonia vapor removed from a gas mixture, e.g., in the form of a flow of the gas mixture (e.g., by passing the flow of gas mixture through a bed of solid adsorbent as shown in FIG. 1) can be at least 50, 60, 70, 80, or 90 percent of the ammonia originally present in the gas stream.

According to the example methods of the description, a continuous flow of a gas mixture can be passed over solid adsorbent, e.g., through a collection or "bed" of solid adsorbent particles, to allow for a continuous process of removing ammonia from the flow of the gas mixture. The gas mixture contains ammonia, non-ammonia vapor, and optional particles, and passes over the collection of adsorbent particles under conditions to cause or allow the ammonia to be adsorbed by the solid adsorbent. The adsorbent will remove a substantial amount of the ammonia while other (non-ammonia) gases and particles in the gas mixture pass substantially or entirely through the collection of adsorbent without being adsorbed by the particles. For example, not more than a minor amount of non-ammonia gases or particles are removed from the flow of gas mixture by the adsorbent particles, e.g., less than 5, 2, or 1 percent non-ammonia gases (by particle count) may be removed from the flow of gas mixture passing through the collection of adsorbent particles.

After a step of adsorbing the ammonia onto the solid adsorbent, and after a useful or desired amount of ammonia has been adsorbed onto an amount of solid adsorbent, the adsorbed ammonia can be removed from the solid adsorbent by heating the solid adsorbent to release the adsorbed ammonia as desorbed gaseous ammonia. This process of removing the adsorbed ammonia from the solid adsorbent by desorption may be referred to as a "desorption step." During adsorption of ammonia vapor onto the solid adsorbent, the gas mixture and solid adsorbent are each independently at a temperature that allows effective and efficient adsorption of the ammonia vapor onto the adsorbent. To remove the adsorbed ammonia from the solid adsorbent, the solid adsorbent that contains the adsorbed ammonia is heated to a desorption temperature, which is a temperature that causes the adsorbed ammonia to desorb so that the ammonia can be flowed from the solid adsorbent and collected. To cause a temperature of the solid adsorbent and adsorbed ammonia to reach a desorption temperature, the solid adsorbent that contains the adsorbed ammonia may be heated, e.g., by a heating element that contacts the solid adsorbent, the gas mixture, or both. Alternatively or additionally the solid adsorbent may be heated by a heating element that contacts a container or vessel that contains the solid adsorbent, or by use of a heated gas that flows over and contacts the solid adsorbent, or by any other effective mode or technique for heating the solid adsorbent that contains the adsorbed ammonia.

Non-limiting examples of a useful desorption temperatures can be at least 20, 30, 40, or 50 degrees Celsius, e.g., from 10 to 100 degrees Celsius including from 10 to 60 degrees Celsius. A temperature that is too high, e.g., greater than about 100 degrees Celsius, risks degrading the ammonia or adsorbent.

A method as described uses solid adsorbent to adsorb ammonia vapor and to remove the ammonia vapor from the gas mixture, particularly from a gas mixture in the form of a continuously flowing gas mixture at a condition of ambient flow pressure. The solid adsorbent can be any that is useful for effectively and efficiently removing ammonia vapor from a gas mixture, especially at an ambient flow pressure.

The solid adsorbent is a material that is generally granular (e.g., in particle form), porous, and with the particles being made of material that is effective to adsorb a contaminant such as organometallic compound. Various types of solid adsorbent materials are known and commercially available. Some examples include: cation exchange resins, anion exchange resins, aluminas, silicas, zeolites, metal oxides, salts, activated carbon (natural and synthetic), chemically-coated carbons, chemically-coated polymers, and metal-organic frameworks, any of which may be provided in the form of porous particles. Any of these or other filter media can also include a chemical treatment, e.g., coating or impregnation, that will improve the adsorptive properties of the filter media, for example, to improve adsorption of one or more general or specific types of organometallic vapor.

An example of a useful solid adsorbent is activated carbon, which is generally known as a highly porous adsorptive material that has a complex structure composed primarily of carbon atoms. Activated carbon can be in the form of granular particles that include a network of pores that are present within a rigid matrix of disordered layers of carbon atoms, linked together by chemical bonds, stacked unevenly, creating a highly porous structure of nooks, crannies, cracks and crevices between the carbon layers. Different varieties of activated carbon include granular activated carbon, powdered activated carbon, and extruded carbon.

One type of zeolite is sometimes described as a microporous crystalline aluminosilicate of alkali or alkaline earth elements represented as:

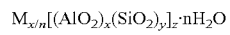

$$M_{x/n}[(AlO_2)_x(SiO_2)_y]_z \cdot nH_2O$$

where x and y are integers with y/x being equal to or greater than 1, n is the valence of the cation M and z is the number of water molecules in each unit cell.

A solid adsorbent can be characterized by surface area. Useful or preferred solid adsorbent materials for use in a method as described can have a surface area in a range from 100 to 1500 square meters per gram ($m^2/g$). A useful or preferred surface can be different based on the type of adsorbent. For example, a surface area for an activated carbon adsorbent may preferably be in a range from 1000 to 1500, e.g., from 1200 to 1300 square meters per gram. A surface area for a zeolite adsorbent may be in a range from 100 to 200 square meters per gram. Surface area of a solid adsorbent can be measured by known techniques, such as by BET nitrogen adsorption techniques.

A useful adsorbent can have properties of pore size and pore volume that are also useful, for example an average pore size of below 150 Angstroms, such as below 100, 50, 15 or below 10 angstroms, e.g., from 3 to 8 angstroms.

Figure 1B:
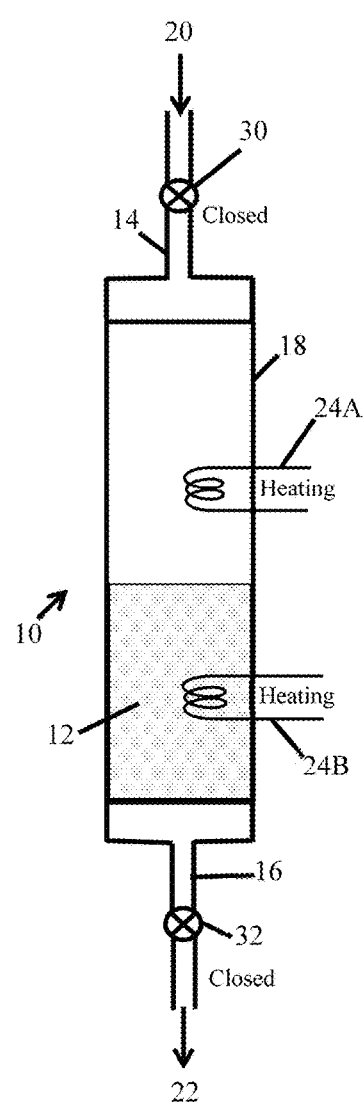
Figure 1C:
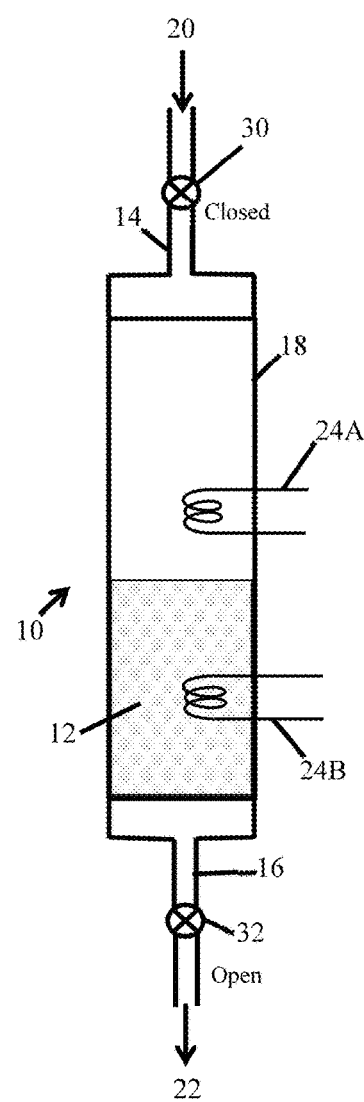

Referring to FIGS. 1A, 1B, and 1C, shown is an example of a continuous or semi-continuous method for removing ammonia vapor from a flow of gas mixture 20. These figures show ammonia separation system 10 for removing ammonia from a flow of gas mixture 20 by adsorbing ammonia from the flow of gas mixture 20 onto solid adsorbent of adsorbent bed 12. FIGS. 1A, 1B, and 1C are used as part of the present description to illustrate certain exemplary processing steps of a continuous or a semi-continuous process for removing ammonia from a flow of a gas mixture, which may be a continuous flow or a semi-continuous flow. Exemplary system 10 and these described steps are non-limiting examples, and other structures and sequences of steps will also be effective in the generally described process of using solid adsorbents to remove ammonia from a gas mixture at a condition of ambient flow pressure. For example, as illustrated, only one single vessel 18 is shown. However, methods of the present description may use two or more such vessels in parallel to allow for continuous processing of a continuous flow of gas mixture 20. Gas mixture 20 may flow through a first vessel 18 during an adsorption step and may flow through a second vessel 18 (in parallel with the first vessel) while a desorption step is performed on the first vessel.

Gas mixture 20 can be any gas mixture, including a gas mixture as described herein that is an exhaust gas derived from a method of producing gallium nitride for manufacturing light emitting devices (LEDs). Gas mixture 20 may have previously been processed (see below) by one or more of a cooling step, a particle removal step, and a step of removing organometallic vapor.

Exemplary vessel 18 includes inlet 14, outlet 16, inlet valve 30, outlet valve 32, an enclosed interior volume between inlet 14 and outlet 16 that contains bed 12 of solid adsorbent, and one or more cooling or heating elements 24A and 24B for cooling or heating incoming gas mixture 20, bed 12, vessel 18, or any combination of these. Valve 32 can be selectively opened or closed to control a flow of gas mixture 20 through outlet 16. Valve 30 can be selectively opened or closed to control a flow of gas mixture 20 through inlet 14.

As illustrated, elements 24A and 24B are in direct contact with gas mixture 20 and bed 12, respectively, but this is not necessary and other arrangements may be used. Alternative heating or cooling elements may be placed at any effective location of system 10 such as by being built into vessel 18 (at a sidewall) or by surrounding vessel 18 (e.g., as a heating or cooling blanket). Additionally or alternatively, cooling element 24A may be provided upstream of valve 30.

FIG. 1A shows a step that can be referred to as an ammonia "adsorption" step. In this step, valves 30 and 32 are open and a steady flow (e.g., continuous but temporary, lasting through the adsorption step) of incoming gas mixture 20 passes through inlet 14, into the interior of vessel 18 and in contact with solid adsorbent of bed 12.

Gas mixture 20 and the interior of vessel 18 are at ambient flow pressure (e.g., below 2.0 or 1.5 atmosphere (gauge)) when passing through inlet valve 30, through the interior of vessel 18, and also when exiting vessel 18 by passing through outlet 16.

When entering vessel 18 through inlet 14, gas mixture 20 can have a temperature derived from an upstream chemical processing or manufacturing step or may have been cooled relative to a temperature of an upstream step. An example of a temperature of gas mixture 20 before being processed by system 10, e.g., before being cooled by element 24A, before passing through inlet 14, or both, may be in a range from 0 to 60, e.g., from 5 to 30 or from 10 to 50 degrees Celsius. Accordingly, a temperature of gas mixture 20, bed 12, vessel 18, or a combination of these may need to be reduced or controlled and maintained at an ammonia adsorption temperature for the adsorption step. Such cooling may be performed by reducing a temperature of one or more of gas mixture 20, bed 12, and vessel 18. As illustrated, by way of example, this can be performed using cooling elements 24A, 24B, or both. Alternative means for cooling gas mixture 20, bed 12, or vessel 18, can also be useful.

As part of system 10, during an adsorption step, vessel 18, bed 12, and gas mixture 20 are held at an ammonia adsorption temperature, which may be below 0 degrees Celsius, for example in a range from −40 to 0 degrees Celsius, such as from −35 to −5 degrees Celsius or from −30 to −20 degrees Celsius.

Gas mixture 20, at the described temperature and pressure conditions, passes through the solid adsorbent of bed 12 to cause or allow a substantial amount of ammonia (e.g., at least 80, 90, or 95 percent (by volume)) in gas mixture 20 to be adsorbed by the solid adsorbent. The gas mixture having the ammonia removed (22) then passes through open valve 32 and outlet 16.

The adsorption step of FIG. 1A can be a step of a semi-continuous method that includes an adsorption step during which ammonia from a flow of gas mixture is adsorbed onto the solid adsorbent, and can be followed by a desorption step during which the flow of gas mixture is stopped and the adsorbed ammonia is desorbed from the solid adsorbent. The adsorption step can be performed for a time sufficient to allow for a desired amount of ammonia to be adsorbed onto the adsorption media of bed 12.

Following the adsorption step of FIG. 1A, including adsorbing a desired amount of ammonia onto the solid adsorbent, a desorption step can be performed to remove the adsorbed ammonia from the solid adsorbent, e.g., as exemplified at FIG. 1B. In a desorption step, vessel 18, bed 12 (containing ammonia adsorbed onto solid adsorbent), or both are heated (e.g., by element 24B) to raise bed 12 to a desorption temperature. This can be done while valves 30 and 32 are in closed positions, to prevent flow through inlet 14 and outlet 16. With the valves closed and the temperature of bed 12 being increased to a desorption temperature, gaseous ammonia accumulates within the enclosed interior of vessel 18, to an increased pressure.

The desorption step is carried out for a time and under conditions that allow for at least a substantial amount of the adsorbed ammonia to be desorbed and removed from the solid adsorbent, e.g., to remove at least 50, 60, 70, 80, 90, or 95 weight percent of the adsorbed ammonia from the solid adsorbent. During desorption, the vessel temperature is caused to reach a desorption temperature (e.g., in a range from 10 to 100 degrees Celsius including 10 to 60 degrees Celsius), and the adsorbed ammonia desorbs from the solid adsorbent and enters a gaseous phase within the interior of vessel 18. At the desorption temperature, in the closed vessel, the pressure of the desorbed ammonia can be greater than atmospheric pressure, e.g., may reach a pressure in a range from 1 to 3 atmospheres (gauge), e.g., from 1.5 to 2.5 atmospheres.

During or after the desorption step, the desorbed ammonia can be removed from vessel 18 through outlet 16 and open valve 32, as shown in FIG. 1C. The desorbed ammonia, at a desorption temperature (from 10 to 100 degrees Celsius, including from 10 to 60 degrees Celsius, e.g., at 20, 25, or 30 degrees Celsius) is preferably at a pressure that is higher than ambient pressure, at ambient temperature, for example at a pressure of at least 1.5 atmospheres (gauge), e.g., in a range from to 1.5 to 3 atmospheres (gauge), at a temperature of 20, 25, or 30 degrees Celsius. A pressure that is above 1 atmosphere (gauge), at an ambient temperature, can be advantageous because the elevated pressure allows the reclaimed ammonia to be moved to a ballast or storage tank while maintaining the elevated pressure.

Figure 2A:
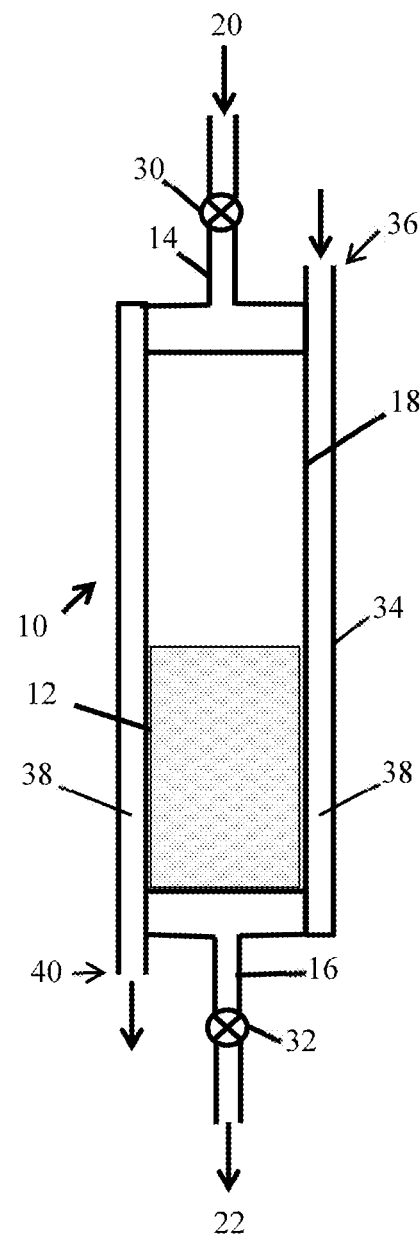
FIGS. 2A, 2B, and 2C show embodiments of devices described.

Ammonia separation system 10 of FIGS. 1A, 1B, and 1C, including vessel 18, is exemplary. A process of the present invention can include other examples of ammonia separation systems that include solid adsorbent in a vessel arranged to perform ammonia separation (adsorption and desorption) as described. Another example of a useful ammonia separation system is shown at FIG. 2A. There, ammonia separation system 10 is shown to include features of system 10 of FIGS. 1A, 1B, and 1C, without cooling and heating elements 24A and 24B, but with a cooling or heating jacket 34, with input opening 36, interior space 38, and output opening 40. In use, the interior of vessel 18 and its contents can be heated or cooled to a desired adsorption or desorption temperature by passing a heating or cooling fluid (e.g., liquid or gas) through interior space 38.

Figure 2B:
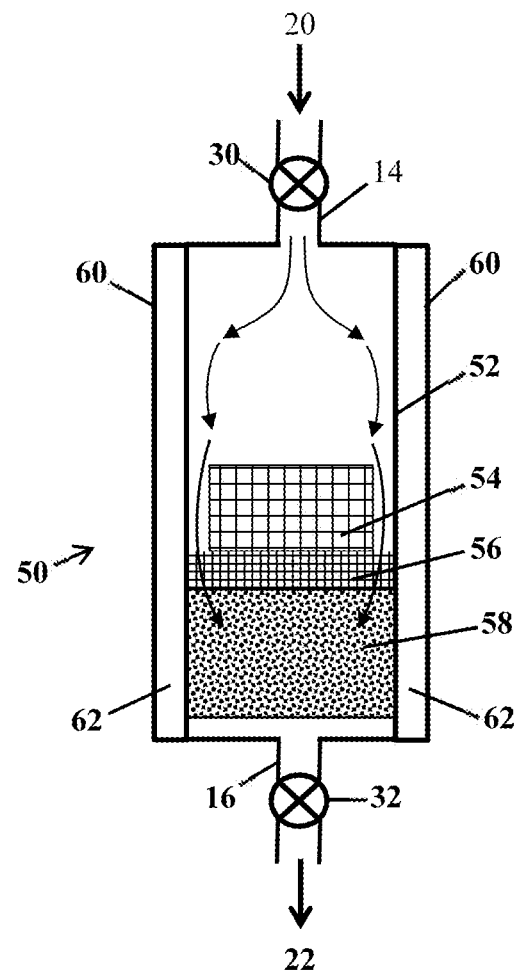

Another example of an ammonia separation system is illustrated at FIG. 2B. System 50 includes vessel 52, inlet 14, outlet 16, inlet valve 30, outlet valve 32, an enclosed interior volume between inlet 14 and outlet 16, and jacket 60 with interior 62 through which a flow of cooling or heating fluid may pass to control (increase or decrease) a temperature of the interior volume and its contents, to selectively place the vessel and contents at an adsorption temperature or a desorption temperature. The interior contains bed 58 of solid adsorbent, optional screen 56, and heat sink 54. Adsorbent 58 is a solid adsorbent as described.

With this design, gas mixture 20 flows into the interior of the vessel and contacts and passes around sides of heat sink 54 in a space between heat sink 54 and an inner wall of vessel 52, as shown by the arrows. A liquid or gaseous fluid may be passed through interior 62 of cooling jacket 60, for example to control the temperature of the contents of the vessel at an adsorption temperature or at a desorption temperature. This design can allow specifically for the removal of heat that is generated between ammonia and adsorbent 58 during an adsorption step of a separation process, by use of heat sink 54 and jacket 60. Heat sink 54 may be made of aluminum or another metal having a high thermal conductivity, to transfer heat energy away from adsorbent 58. Heat sink 54 may include multiple heat sink pieces (e.g., shaped as "cooling pucks") placed in series to effectively control a temperature of (especially to cool) gas mixture 20 passing through the vessel interior. Cooling of vessel 52 and its contents during an adsorption step (e.g., to a temperature of from 0 to -40 degrees Celsius) can be provided by removal of heat through jacket 60 using a refrigerant and refrigeration system.

Figure 2C:
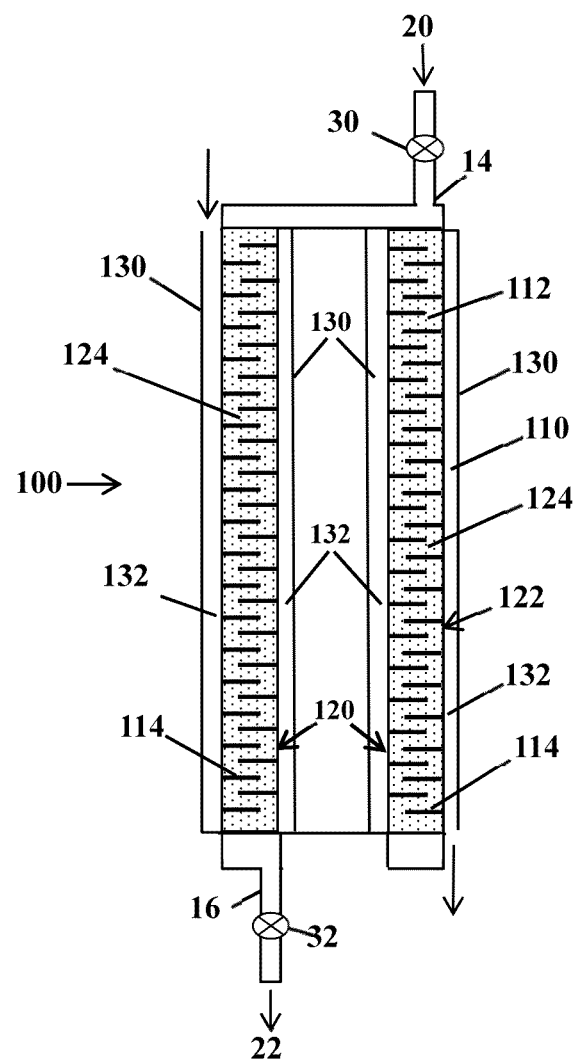

One more example of an ammonia separation system is illustrated at FIG. 2C. System 100 includes annular vessel 110, inlet 14, outlet 16, inlet valve 30, outlet valve 32, annular interior volume 124 between inlet 14 and outlet 16, and jacket 130 with interior 132 through which a flow of cooling or heating fluid may pass to control (increase or decrease) a temperature of the interior volume and its contents, to selectively place the vessel and contents at an adsorption temperature or a desorption temperature. Annular vessel interior 124, defined by inner sidewall 120 and outer sidewall 122, contains solid adsorbent bed 112, with baffles 114 extending laterally from the inner and outer sidewalls. Jacket 130 encloses annular vessel 110, with jacket interior 132 being present to contact both of inner sidewall 120 and outer sidewall 122. Baffles 114 at vessel interior 124 are effective to re-direct flow of gas mixture 20 through bed 112 to allow for increased circulation of gas mixture 20 within interior 124, and more uniform contact and exchange of heat between gas mixture 20 and inner and outer sidewalls 120 and 122.

A step of processing a gas mixture as described, by adsorbing ammonia vapor onto solid adsorbent to remove the ammonia from the gas mixture, can be part of a larger process of processing a gas mixture that contains ammonia and other vapor and non-vapor materials, for example to recover and re-use the ammonia. For example, FIG. 3 illustrates a multi-step process for treating hot exhaust gas from a process for preparing light emitting devices, to recover the ammonia.

Figure 3:
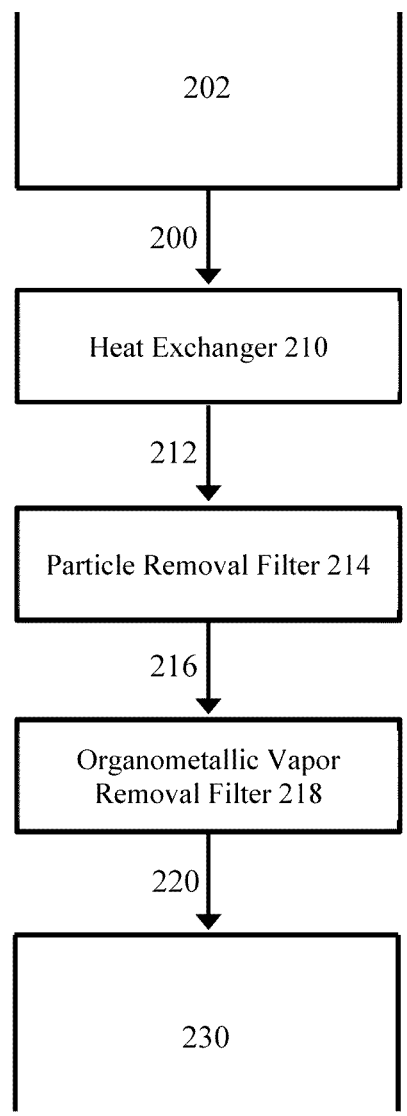
FIG. 3 shows an example of a system or a set of devices or method steps as described for removing ammonia vapor from a gas mixture.

As shown in FIG. 3, the present methods can be useful in an illustrated example of a multi-stage system and method of processing a heated gas mixture (e.g., an "exhaust") by reducing the temperature of the gas mixture, removing organometallic vapor from the gas mixture, removing particles from the gas mixture, and separating ammonia from the gas mixture.

As illustrated, process 202 is an industrial process that produces gas mixture 200, which includes ammonia vapor, as a flow (stream) of heated exhaust gas. Process 202 may be any commercial process that produces a gas mixture that contains ammonia, and, in particular embodiments, of the present description can be a process of producing light emitting devices (LEDs). This type of process is known to require very large volumes of high purity gases as raw materials, including ammonia, di-atomic nitrogen gas, and di-atomic hydrogen gas. The process includes producing active semiconducting layers by epitaxial deposition, which is performed by metal-organic chemical vapor deposition (MOCVD). The step of MOCVD creates metal-nitride compounds such as indium gallium nitride (InGaN) from volatile metal-organic precursors such as trimethyl gallium, also in combination with a source of nitrogen such as ammonia. The multilayer LED structures are deposited onto a substrate, which is typically sapphire.

Very high purity raw materials are required for performing this type of LED manufacturing process. One of these raw materials is the ammonia, which, unfortunately, is not used efficiently in MOCVD processes and is present in a substantial amount in an exhaust stream produced by the process. That exhaust stream is a heated gas mixture that contains a substantial amount of ammonia, metal-containing precursors (organometallic vapor) such as trimethyl gallium precursors, non-organometallic vapors such as hydrogen ($H_2$) and nitrogen ($N_2$), and, possibly, solid particles such as organometallic particles. Examples of this type of gas mixture, produced as an exhaust gas from a metal-organic chemical vapor deposition step for producing a metal-nitride compound of an LED structure can have amounts of ammonia vapor, hydrogen vapor, and nitrogen vapor, as follows: from 15 to 40 volume percent ammonia vapor, from 0 to 60 volume percent hydrogen vapor, and from 0 to 70 volume percent nitrogen vapor; e.g., from 15 to 35 volume percent ammonia vapor, from 5 to 50 volume percent hydrogen vapor, and from 5 to 60 volume percent nitrogen vapor. The gas mixture will also contain an amount of organometallic vapor (e.g., trimethyl gallium) and an amount of solid particles (e.g., micro-particles, sub-micron particles, or the like). The exhaust will flow from the MOCVD process at an elevated temperature, which will depend on factors such as the distance from the reactor and whether the exhaust has been processed by a cooling step to reduce the temperature. A temperature of an exhaust leaving a reactor can approximate the temperature of the reactor, which may be as high as 500 degrees Celsius. After leaving the reactor the temperature may fall or be reduced by a cooling step but may remain at an elevated temperature that is higher than 50, 60, 70, or 80 degrees Celsius, and an ambient flow pressure, before being processed by a device or system of the present description.

Desirably, to reduce cost and waste, the ammonia contained in this type of heated exhaust gas mixture can be collected and re-used. This requires separating the ammonia gas from any non-ammonia materials of the gas stream, e.g., the organometallic vapor, nitrogen vapor, hydrogen vapor, and any particle debris. Accordingly, as one example of a useful application of a method described herein for removing ammonia vapor from a gas mixture, such a method can be used to remove ammonia vapor from the referenced type of exhaust stream as a heated gas mixture following upstream steps of cooling the exhaust gas mixture and removing organometallic vapor and solid particles from the gas mixture.

Referring again to FIG. 3, gas mixture 200 can be a hot exhaust gas as described, flowing from process 202, which may be a process of producing light emitting devices (LEDs). Gas mixture 200 may contain ammonia vapor, hydrogen vapor, nitrogen vapor, organometallic vapor, and an amount of solid particles (e.g., micro-particles, sub-micron particles, or the like). Gas mixture 200 exits process 202 at an elevated temperature, such as a temperature of a least 60, 70, or 80 degrees Celsius, and at an ambient flow pressure.

After exiting process 202, gas mixture 200 passes through a cooling stage, multiple filtering stages to remove non-ammonia vapor and particles, and then an ammonia separation stage. For example, gas mixture 200 may pass through heat exchanger 210, particle removal filter 214, and organometallic vapor removal filter 218, followed by ammonia separation step 230. The illustrated order of passing through each of the cooling and filtering steps is to pass through heat exchanger 210 as the first stage, then particle removal filter 214 as a second stage, and then organometallic vapor removal filter 218 as a third stage. However, these steps may be performed in a different order if desired and may also be performed by including one or more additional steps (or stages) performed before, after, or in-between any of these three steps. For example, a second particle removal filter may optionally be included after vapor removal filter 218, as a fourth stage, and before ammonia separation step 230, to remove any particles (e.g., micron-scale or sub-micron-scale particles) still remaining in a gas mixture after processing by the first three stages.

As shown at FIG. 3, the gas mixture exits heat exchanger 210 as cooled gas mixture 212, e.g., having a temperature in a range from 0 to 60, e.g., from 0 to 50 or from 0 to 40 degrees Celsius. Cooled gas mixture 212 enters particle removal filter 214 and exits as filtered gas stream 216 having a reduced level of particles. The cooled gas mixture having reduced particles enters organometallic vapor removal filter 218 (see FIGS. 6A and 6B) and exits as gas stream 220 having a reduced level of organometallic vapor. Gas mixture 220 may be further optionally processed by use of another particle filter, such as a microfiltration step as a fourth stage, to remove micron-sized or sub-micron-sized particles (such as particles having a particle size of below 6, 5, 4, or 3 microns). The organometallic particles that are present in the exhaust stream are preferably removed for the purpose of providing high purity ammonia but also because the organometallic particles, if not removed, have the potential to cause various processing difficulties in the downstream ammonia separation process. Organometallic particles have the potential to clog equipment that is used for separating gaseous ammonia from the exhaust stream. As one example, a separation system may include mechanical valves that will not properly close and seal properly if organometallic particles accumulate on surfaces of the valves. Another concern is that organometallic particles can disrupt the performance of (e.g., clog) filters (e.g., molecular sieves) used to remove gaseous ammonia from the exhaust stream.

Figure 4:
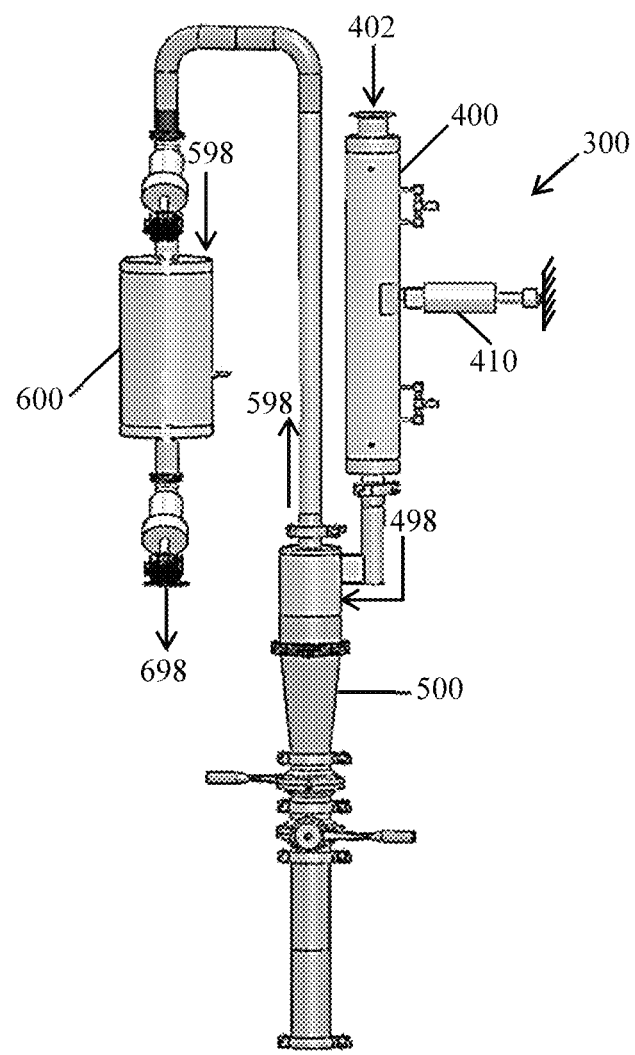
FIG. 4 shows example components of a system as described.

FIG. 4 shows certain specific examples of useful devices of the example system of FIG. 3 for a cooling step and multiple filtering steps, before a step of separating ammonia from a gas mixture flow. System 300 includes heat exchanger 400, particle removal filter 500, and organometallic vapor removal filter 600, in that order. As shown, gas mixture 402, e.g., exhaust gas having a temperature of greater than 60 degrees Celsius, enters heat exchanger 400, passes through the heat exchanger, and exits the heat exchanger as cooled gas mixture 498, e.g., having a temperature in a range from 0 to 60 degrees Celsius including from 0 to 50 degrees Celsius. Cooled gas mixture 498 enters particle removal filter 500 where a substantial portion of solid particles is removed from the cooled gas mixture. The gas mixture exits particle removal filter 500 as filtered gas stream 598 having a reduced level of solid particles. The gas mixture having reduced particles enters organometallic vapor removal filter 600 (see FIGS. 6A and 6B) and exits as gas stream 698 having a reduced level of particles and organometallic vapor, and a reduced temperature, relative to incoming gas mixture 402.

Also shown in FIG. 4 is oscillator or "vibrator" 410 which attaches between heat exchanger 400 and a solid support (e.g., wall), and vibrates to cause continuous, oscillating or vibrating movement of heat exchanger 400. The nature of the vibration, e.g., the frequency and distance of movement that constitutes the vibration, can be effective to prevent particulate buildup at interior surfaces of heat exchanger 400.

Figure 5:
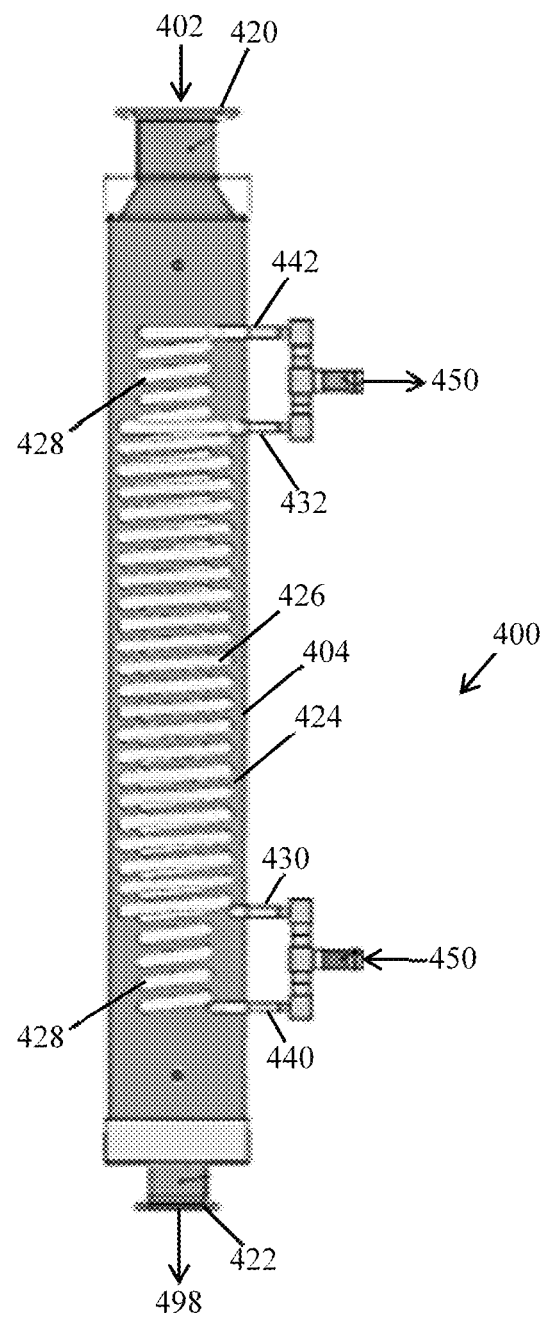
FIG. 5 shows an example of a heat exchanger that may be useful in a system or method as described.

FIG. 5 is a more detailed illustration of an example of a useful heat exchanger 400. As illustrated, heat exchanger 400 is a counterflow coil-type heat exchanger that includes heat exchanger body 404, body inlet 420, body outlet 422, and a body interior volume 424. Further, hollow coil body 426 is located within heat exchanger body interior volume 424 and includes coil inlet 430, coil outlet 432, and multiple coil turns between the coil inlet and the coil outlet. Second hollow coil body 428 is also located within heat exchanger body interior volume 424 and is connected to second coil inlet 440 and second coil outlet 442.

Cooling liquid 450 enters the hollow coil body at the coil inlets, flows through the hollow coil body in a direction opposite of a direction of flow of the heated gas mixture passing through the heat exchanger body, and exits the hollow coil body at the coil outlets. Heated gas mixture 402 enters the heat exchanger body at the body inlet at a first temperature, passes through the interior volume and over exterior surfaces of the hollow coils, and exits the heat exchanger body at the body outlet at a reduced temperature.

Figure 6A:
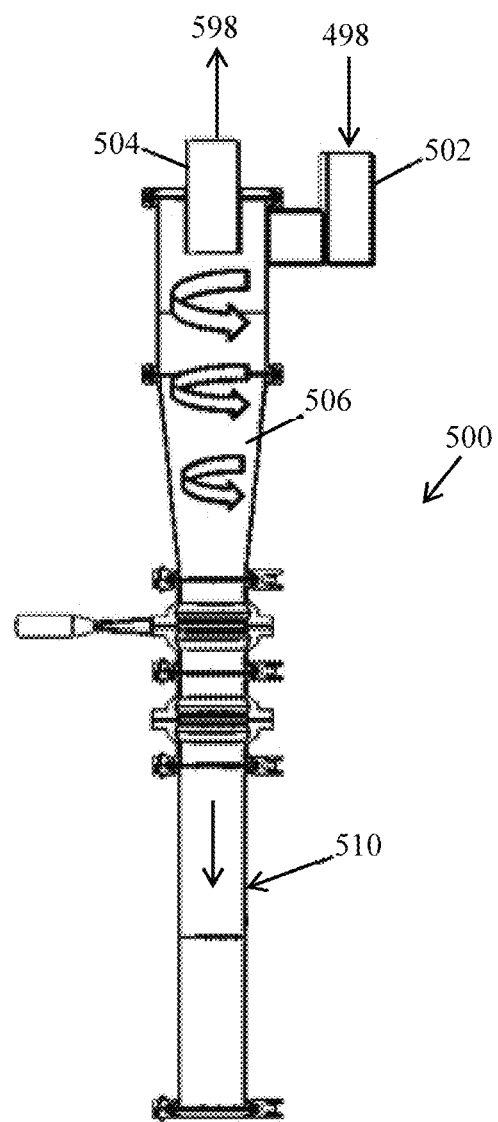
FIGS. 6A and 6B show example particle filters that may be useful in a system or method as described.

FIG. 6A shows a single example of a particle removal filter 500. As illustrated, filter 500 is a cyclonic filter that removes particles from entering gas mixture 498 by circulating gas mixture 498 in a cyclonic flow (shown by the circular arrows) at interior 506 of filter 500. Gas mixture 498 enters filter 500 through inlet 502, passes through conical filter interior 506, and exits as through outlet 504 as gas mixture 598 having a substantial amount of particles being removed. Particles contained in the gas mixture circulating at conical interior 506 are drawn, e.g., by gravity, in a downward direction to particle trap 510 where the particles can exit filter 500 and be removed from the gas mixture. The circulating gas mixture flows in a circular direction, and upward, to exit through outlet 504 while containing a reduced amount of particles.

Figure 6B:
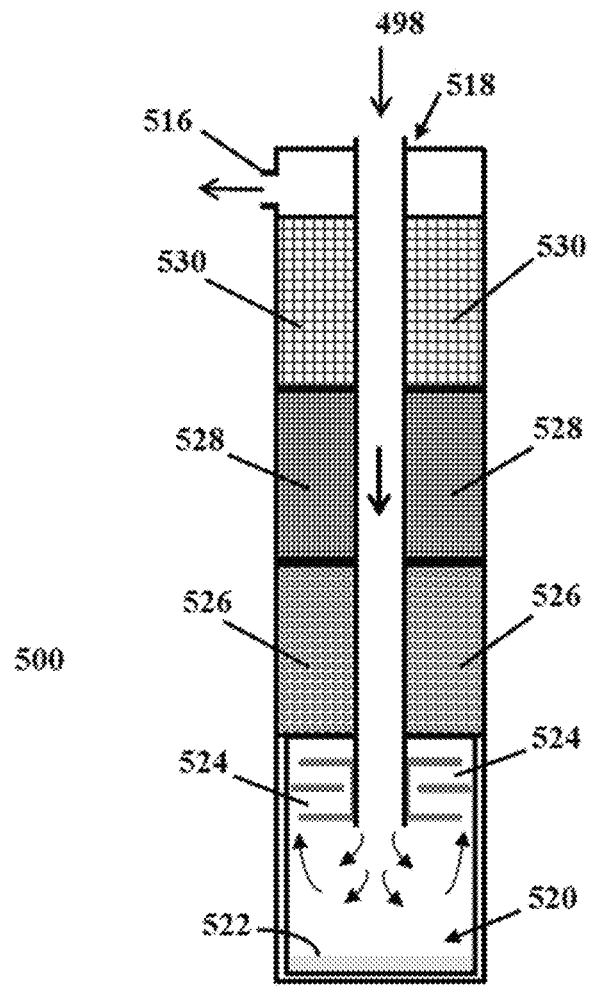

In another embodiment, instead of a cyclonic filter, filter 500 may be a multi-stage filter that includes one or more of an impaction stage, a carbon fiber collection stage, a tortuous path (e.g., labyrinth) stage, and a fiber media stage that can be included with or as an alternative to the illustrated cyclonic filter. FIG. 6B shows an example of filter 500 that includes an inlet 518 for gas mixture 498, and an outlet 516 for filtered gas mixture 598. In between the inlet and outlet are multiple filtration stages. A first stage is impaction stage 520, including carbon fiber layer 522 at a bottom of the filter. Gas mixture 498 flows down and contacts (impacts) carbon fiber layer 522, where particles can become captured and entrapped in the carbon fiber layer.

A next stage is "labyrinth" or "tortuous path" stage 524, made using baffles or other physical structures that divert the flow of the gas mixture and are effective to capture, restrict, or restrain the further progress of at least a portion of particles present in the gas mixture as it flows through the tortuous path.

One or more additional filter stages 526, 528, and 530, can include one or more fibrous filter materials effective to allow flow of the gas mixture through the stage, with retention of particles in the fibrous material. The fibrous filter material can be selected to provide good filtering, with good flow of a gas mixture through the filter stage, preferably without impurities being degassed (outgassed) from the fibrous filter material into the gas mixture passing through the fibrous filter material. The fibrous filter material may be any useful material, different varieties of which are generally known, including stainless steel wool, carbon wool, ceramic wool, etc.

A useful filter 500 (e.g., a cyclonic filter, a multi-stage filter, or another type of particle filter) can be effective to remove micro particles having a particle size (in terms of diameter) of below 30, 20, and 10 microns, e.g., to a size of as small as about 5 or 6 microns.

Figure 7A:
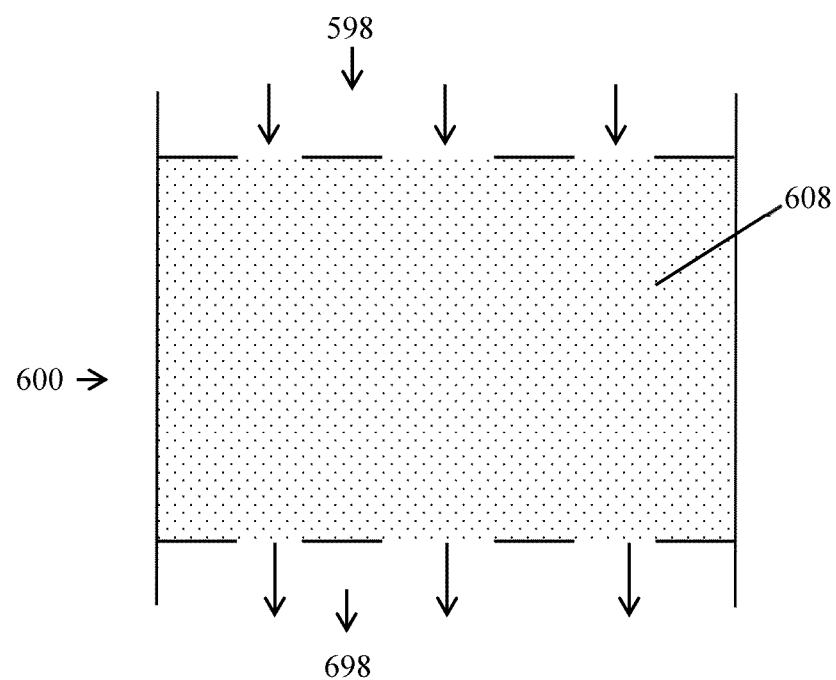
FIG. 7A shows an example of an organometallic vapor removal filter that may be useful in a system or method as described.

Referring now to FIG. 7A, illustrated is a schematic view of a method and device for removing gaseous organometallic vapor from a gas mixture that contains the organometallic vapor and ammonia, by adsorbing the organometallic vapor onto solid adsorbent. Filter 600 includes bed 608 of solid adsorbent particles as described herein, e.g., activated carbon, zeolite, or the like. Gas mixture 598 contains ammonia vapor, organometallic vapor, other non-organometallic and non-ammonia vapor, and potentially other particles (e.g., micro-particles, sub-micron particles, or the like). Gas mixture 598 flows into an inlet of filter 600 on an upstream side of bed 608, flows through bed 608, and then exits filter 600 on an opposite (downstream) side of bed 608 as filtered gas mixture 698, containing a reduced amount of the organometallic vapor. A rate and volume of flow (e.g., flux), and a pressure of the flow of gas mixture 598 are effective to allow gas mixture 598 to reside within bed 608 for a time that will allow for a majority, most, or substantially all of the organometallic vapor present in gas mixture 598 to be removed from the gas mixture to produce filtered gas mixture 698. For example, gas mixture 698 can contain less than 30, 20, 10, or 5 percent of the total amount of organometallic vapor originally contained in gas mixture 598. Other vapor or vapors (non-organometallic vapors) present in gas stream 598 will pass substantially through bed 608 and not become adsorbed onto the solid adsorbent particles of bed 608, exiting filter 600 as vapor contained in gas mixture 698.

According to example methods of this description, gas mixture 598 is at conditions that include an ambient flow pressure and a temperature that is above an ammonia adsorption temperature, e.g., a temperature of greater than 0 degrees Celsius or in a range from 0 to 60 degrees Celsius, including from 0 to 50 or from 0 to 40 degrees Celsius.

The organometallic vapor can be an organometallic compound that contains a metal atom bonded (e.g., covalently bonded) to one or more organic moieties (also sometimes referred to as an "organyl group"), i.e., the organometallic compound includes at least one carbon-to-metal bond between a metal atom and an organic moiety. The metal may be any metal, such as an alkali metal, alkaline earth metal, or a transition metal. Example metals include aluminum, gallium, antimony, titanium, cobalt, tungsten, and indium. The organic moiety may be any organic group capable of forming a carbon-metal covalent bond, such as: alkyl (e.g., methyl, ethyl, propyl, etc.), aryl, alkylsilyl, alkylboryl, carbonyl, and cyano. These groups may be linear, branched, or cyclic, may contain unsaturation such as a carbon-carbon double bond or an aromatic ring structure, and may optionally contain one or more heteroatoms or hydrogen substitution.

Non-limiting examples of organometallic compounds that are part of a gas mixture, as organometallic vapor, with the organometallic vapor being one that can be effectively adsorbed by solid adsorbent to remove the organometallic vapor from the gas mixture, include organometallic compounds that include, as the metal, a transition metal such as gallium, aluminum, indium, etc. The metal is associated with one or more organic residue, which may be, e.g., an alkyl group. For a metal atom that is associated with more than one organic residues, the two or more organic residues may be the same or different. Specific examples of such organometallic compounds include trimethyl gallium, trimethyl indium, and trimethyl aluminum, and trimethyl antimony (($CH_3$)$_3$Sb).

Example organometallic compounds can also be chemical derivatives of any of these or other organometallic compounds. An organometallic compound may react with another gaseous chemical present during a process (e.g., a deposition), for example with gaseous nitrogen, oxygen, water, or hydrogen, to form a derivative oxide, salt, metal oxide, hydroxide, or the like.

Figure 7B:
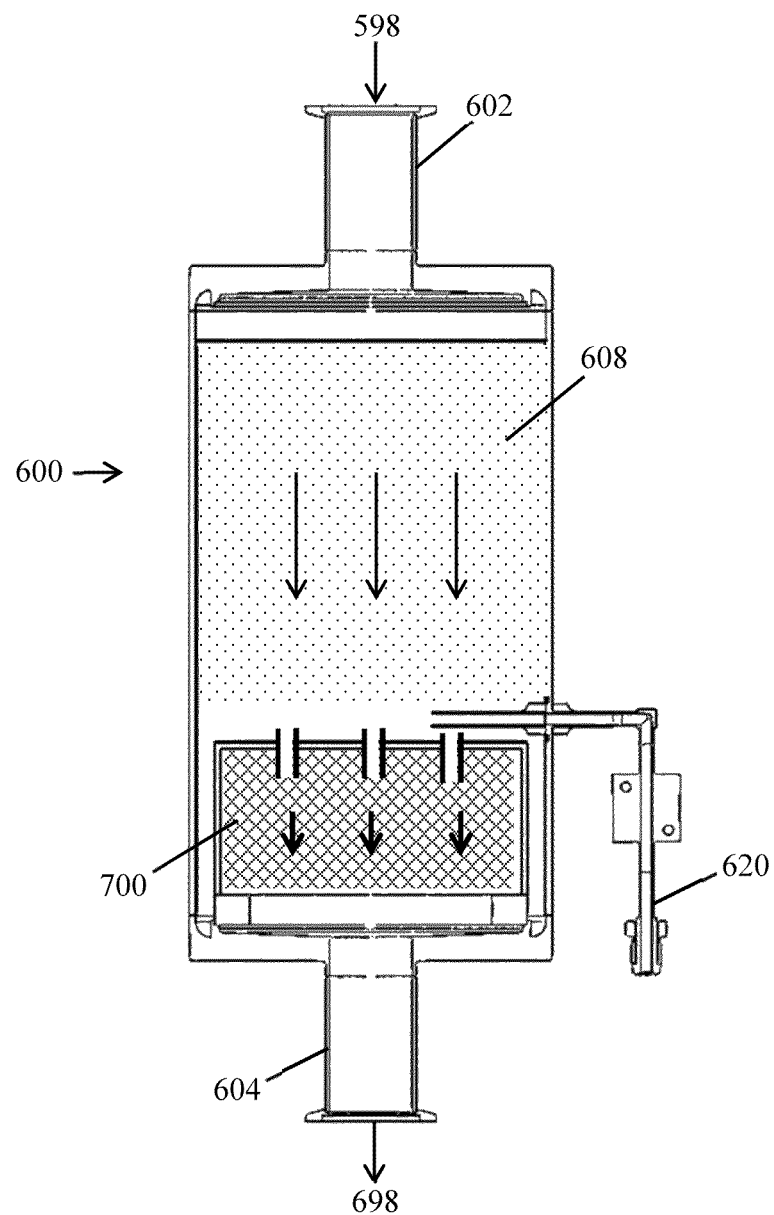
FIG. 7B shows an example of an organometallic vapor removal filter and optional particle filter that may be useful in a system or method as described.

Solid adsorbent for removing organometallic vapor can be any solid adsorbent that will effectively function for this purpose, to remove organometallic vapor from a gas mixture that includes ammonia, as described herein. Examples include solid adsorbent materials described hereinabove with respect to the ammonia removal step, specifically including activated carbon FIG. 7B shows a more specific example of a third and fourth stage of a multi-stage system as illustrated at FIG. 3, the example third stage being an example of organometallic vapor removal filter 600 and the example fourth stage being second particle removal filter 700. As illustrated, organometallic vapor removal filter 600 and second particle removal filter 700 are contained in a single structure, filter 600, but these two stages of filtering could instead be contained separately in two different filter structures that allow a gas mixture to be flowed individually through both of the two separate filters.

As illustrated, filter 600 includes inlet 602, outlet 604, and an interior volume that includes first filter bed 608 that contains solid adsorbent and second bed 700 that contains a second particle removal filter. Gas mixture 598 enters filter 600 through inlet 602, passes through first bed 608 and the contained solid adsorbent therein to cause organometallic vapor from the gas stream to adsorb onto the solid adsorbent and be removed from the gas stream. Next the gas mixture enters and passes through second bed 700 and a particle filter contained in the second bed to remove micron-sized or sub-micron-sized particles from the gas stream.

Gas mixture 598 can be at conditions that include an ambient flow pressure and a temperature that is above an ammonia adsorption temperature, e.g., a temperature of greater than 0 degrees Celsius, e.g., in a range from 0 to 60 degrees Celsius or from 0 to 40 degrees Celsius.

A useful second particle filter 700 can be effective to remove micro particles having a particle size (in terms of diameter) that is smaller than the size of particles removed by a previous particle filter, e.g., a cyclonic filter as illustrated in FIG. 6. For example, a second particle filter 700 can be a capable of microfiltration, to remove micron-sized or sub-micron-sized particles, e.g., particles having a particle size of below 6, 5, 4, 3, 1, 0.5, or 0.1 microns.

Sample port 620 allows for removing a sample of the gas mixture flowing through bed 608 for analytical testing, such as to measure for the presence and amount of organometallic compounds.

After exiting filter 600, the flow of gas mixture 698 can be further processed to remove ammonia vapor from the gas mixture as described herein, for example (but not necessarily) according to the example system and steps that are illustrated and described with respect to FIGS. 1A, 1B, and 1C.

In a first aspect, a method of removing ammonia from a gas mixture that contains gaseous ammonia comprises: i) delivering the gas mixture at ambient flow pressure to a vessel that contains solid adsorbent; and ii) contacting the gas mixture at ambient flow pressure and an ammonia adsorption temperature, with the solid adsorbent, to cause the ammonia to adsorb onto the solid adsorbent.

A second aspect according to the first aspect further comprises: after an amount of ammonia has been adsorbed onto the solid adsorbent, desorbing the adsorbed ammonia from the solid adsorbent by heating the solid adsorbent to release the adsorbed ammonia as desorbed gaseous ammonia; and removing the desorbed gaseous ammonia from the vessel.

A third aspect according to any preceding aspect, further comprises: cooling the gas mixture, solid adsorbent, or both, to an ammonia adsorption temperature at which the gaseous ammonia of the gas mixture adsorbs onto the solid adsorbent at the ambient flow pressure.

A fourth aspect according to the third aspect is wherein the ammonia adsorption temperature is in a range from −40 degrees Celsius to 0 degrees Celsius.

A fifth aspect according to any preceding aspect is wherein the gas mixture contains the ammonia and a non-ammonia vapor, and the non-ammonia vapor does not adsorb onto the solid adsorbent at the ammonia adsorption temperature.

A sixth aspect according to the first aspect is wherein the gas mixture contains gaseous ammonia, gaseous hydrogen, and gaseous nitrogen, the method further comprising: delivering the gas mixture to the solid adsorbent with the gas mixture, solid adsorbent, or both having a temperature in a range from −40 to 0 degrees Celsius; allowing the ammonia to adsorb onto the solid adsorbent; after an amount of ammonia has adsorbed onto the solid adsorbent, increasing the temperature of the solid adsorbent that contains adsorbed ammonia to a desorption temperature to desorb the adsorbed ammonia from the solid adsorbent to form liquid ammonia; and removing the liquid ammonia from the vessel.

A seventh aspect according to the sixth aspect is wherein the gas mixture, the solid adsorbent, or both, have a temperature in a range from −30 to −15 degrees Celsius.

An eighth aspect according to the sixth or seventh aspect is wherein the desorption temperature is below 60 degrees Celsius.

A ninth aspect according to any of the sixth through eighth aspects is wherein the solid adsorbent is selected from activated carbon and zeolite.

A tenth aspect according to any of the sixth through ninth aspects is wherein the gas mixture as delivered to the vessel comprises: from 15 to 40 volume percent gaseous ammonium; from 0 to 60 volume percent gaseous hydrogen; and from 0 to 70 volume percent gaseous nitrogen.

In an eleventh aspect, a method of treating a gas mixture that contains ammonia, non-ammonia vapor, organometallic vapor, and solid particles comprises: i) cooling the gas mixture by passing the gas mixture through a heat exchanger to produce a cooled gas mixture; ii) passing the cooled gas mixture through a particle filter to remove the solid particles; iii) passing the cooled gas mixture through a first solid adsorbent to adsorb organometallic vapor onto the first solid adsorbent; and iv) contacting the cooled gas mixture with a second solid adsorbent to cause ammonia to adsorb onto the second solid adsorbent.

A twelfth aspect according to the eleventh aspect is wherein the non-ammonia vapor comprises gaseous hydrogen, gaseous nitrogen, or a combination thereof.

A thirteenth aspect according to the eleventh or twelfth aspect is wherein the heated gas mixture has a temperature greater than 60 degrees Celsius.

A fourteenth aspect according to any of the eleventh through thirteenth aspects is wherein the cooled gas mixture has a temperature in a range from 0 to 60 degrees Celsius.

A fifteenth aspect according to any of the eleventh through fourteenth aspects further comprises contacting the cooled gas mixture at ambient flow pressure and an ammonia adsorption temperature, with the second solid adsorbent, to cause the ammonia to adsorb onto the second solid adsorbent.

A sixteenth aspect according to the fifteenth aspect further comprises cooling the gas mixture, second solid adsorbent, or both, to the ammonia adsorption temperature.

A seventeenth aspect according to the fifteenth or sixteenth aspect is wherein the ammonia adsorption temperature is in a range from −40 to 0 degrees Celsius.

An eighteenth aspect according to any of the eleventh through seventeenth aspects further comprises: after an amount of ammonia has been adsorbed onto the second solid adsorbent, desorbing the adsorbed ammonia from the second solid adsorbent by heating the second solid adsorbent to release the adsorbed ammonia as desorbed gaseous ammonia.

A nineteenth aspect according to any of the eleventh through eighteenth aspects is wherein the heat exchanger is a counterflow coil heat exchanger comprising: a hollow heat exchanger body comprising a body inlet, a body outlet, and a body interior volume, and a hollow coil body located within the heat exchanger body interior volume and comprising a coil inlet, a coil outlet, and multiple coil turns between the coil inlet and the coil outlet, wherein: the gas mixture enters the hollow heat exchanger body at the body inlet, passes through the interior volume and over an exterior surface of the hollow coil, and exits the hollow heat exchanger body at the body outlet, and the cooling liquid enters the hollow coil body at the coil inlet, flows through the hollow coil body in a direction opposite of a direction of flow of the gas mixture passing through the hollow heat exchanger body, and exits the hollow coil body at the coil outlet.

A twentieth aspect according to any of the eleventh through nineteenth aspects is wherein the gas mixture comprising: from 15 to 40 volume percent gaseous ammonia; from 0 to 60 volume percent gaseous hydrogen; from 0 to 70 volume percent gaseous nitrogen; and organometallic compound.

A twenty-first aspect according to the twentieth aspect is wherein the organometallic compound is trimethyl gallium.

In a twenty-second aspect, a system for processing a gas mixture that contains organometallic vapor, particles, and non-organometallic vapor comprises: i) a heat exchanger adapted to reduce a temperature of the gas mixture; ii) a particle filter capable of removing solid particles from the gas mixture; iii) an organometallic vapor removal filter capable of removing organometallic vapor from the gas mixture; and iv) a vessel that contains solid adsorbent capable of removing ammonia vapor from the gas mixture by adsorbing the ammonia vapor onto the solid adsorbent at conditions that include an ambient flow pressure and an ammonia adsorption temperature, wherein the heat exchanger, the particle filter, the organometallic vapor removal filter and the vessel are in fluid communication with each other.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. Changes may be made in the details, particularly in matters of shape, size, and arrangement of parts without exceeding the scope of the disclosure. The disclosure's scope is, of course, defined in the language in which the appended claims are expressed.

What is claimed is:

1. A method of removing ammonia from a gas mixture comprising gaseous ammonia, gaseous hydrogen, and gaseous nitrogen, the method comprising:
   delivering the gas mixture at an ambient flow pressure to a vessel that contains a solid adsorbent, with the gas mixture, the solid adsorbent, or both at an ammonia adsorption temperature in a range of from −40 to 0 degrees Celsius,
   contacting the gas mixture at the ambient flow pressure and at the ammonia adsorption temperature with the solid adsorbent to cause an amount of ammonia to adsorb onto the solid adsorbent,
   after the amount of ammonia has adsorbed onto the solid adsorbent, increasing the temperature of the solid adsorbent that contains adsorbed ammonia to a desorption temperature to desorb the adsorbed ammonia from the solid adsorbent to form liquid ammonia; and
   removing the desorbed liquid ammonia from the vessel.

2. The method of claim 1, wherein the gas mixture, the solid adsorbent, or both are cooled to the ammonia adsorption temperature at which the gaseous ammonia of the gas mixture adsorbs onto the solid adsorbent at the ambient flow pressure.

3. The method of claim 1, wherein the ammonia adsorption temperature is in a range from −35 degrees Celsius to −5 degrees Celsius.

4. The method of claim 1, wherein the gaseous hydrogen and the gaseous nitrogen do not adsorb onto the solid adsorbent at the ammonia adsorption temperature.

5. The method of claim 1, wherein the gas mixture, the solid adsorbent, or both have a temperature in a range from −30 to −15 degrees Celsius.

6. The method of claim 1, wherein the desorption temperature is below 60 degrees Celsius.

7. The method of claim 1, wherein the solid adsorbent is selected from activated carbon and zeolite.

8. The method of claim 1, wherein the gas mixture delivered to the vessel comprises:
   from 15 to 40 volume percent gaseous ammonium;
   from 0 to 60 volume percent gaseous hydrogen; and
   from 0 to 70 volume percent gaseous nitrogen.

9. The method of claim 1, wherein the gas mixture further comprises organometallic vapor and solid particles, and wherein the method further comprises:
   cooling the gas mixture to the ammonia adsorption temperature by passing the gas mixture through a heat exchanger to produce a cooled gas mixture,
   passing the cooled gas mixture through a particle filter to substantially remove the solid particles, and
   passing the cooled gas mixture with substantially removed solid particles through a first solid adsorbent to substantially remove organometallic vapor by adsorbing the organometallic vapor onto the first solid adsorbent.

10. The method of claim 9, wherein, the gas mixture has a temperature greater than 60 degrees Celsius prior to delivering the gas mixture to the vessel.

11. The method of claim 9, wherein the cooled gas mixture has a temperature in a range from 0 to 60 degrees Celsius.

12. The method of claim 9, wherein the heat exchanger is a counterflow coil heat exchanger comprising:
   a heat exchanger body comprising a body inlet, a body outlet, and a body interior volume, and
   a hollow coil body located within the heat exchanger body interior volume and comprising a coil inlet, a coil outlet, and multiple coil turns between the coil inlet and the coil outlet, wherein:
   the gas mixture enters the heat exchanger body at the body inlet, flows through the body interior volume and over an exterior surf ace of the hollow coil body, and exits the heat exchanger body at the body outlet, and
   a cooling liquid enters the hollow coil body at the coil inlet, flows through the hollow coil body in a direction opposite of a direction of flow of the gas mixture passing through the heat exchanger body, and exits the hollow coil body at the coil outlet.

13. The method of claim 9, wherein the gas mixture comprises:
   from 15 to 40 volume percent gaseous ammonia;
   from 0 to 60 volume percent gaseous hydrogen;
   from 0 to 70 volume percent gaseous nitrogen; and organometallic vapor.

14. The method of claim 13, wherein the organometallic vapor is trimethyl gallium vapor.

15. A system for processing a gas mixture comprising gaseous ammonia, non-ammonia vapor, organometallic vapor, and solid particles, the system comprising:
   a heat exchanger adapted to reduce a temperature of the gas mixture;
   a particle filter capable of removing solid particles from the gas mixture;
   an organometallic vapor removal filter capable of removing organometallic vapor from the gas mixture; and
   a vessel that contains solid adsorbent capable of removing ammonia vapor from the gas mixture by adsorbing the ammonia vapor onto the solid adsorbent at conditions that include an ambient flow pressure and an ammonia adsorption temperature and is further capable of desorbing the adsorbed ammonia vapor from the solid adsorbent at conditions that include a desorption temperature to form liquid ammonia that is removable from the vessel,
   wherein the heat exchanger, the particle filter, the organometallic vapor removal filter and the vessel are in fluid communication with each other.

* * * * *